3,425,977
WATER-CONTAINING COATING COMPOSITION
COMPRISING A SALT OF AN ANHYDRIDE CO-
POLYMER PARTIAL ESTER
Martin Skoultchi, New York, N.Y., and Benjamin D. Ju-
bilee, Plainfield, N.J., assignors to National Starch and
Chemical Corporation, New York, N.Y., a corporation
of Delaware
No Drawing. Filed Aug. 27, 1965, Ser. No. 483,321
U.S. Cl. 260—23   16 Claims
Int. Cl. C09d 3/64, 3/74; C08f 27/17

ABSTRACT OF THE DISCLOSURE

Novel water soluble, surface coating compositions characterized by their ability to crosslink upon being air-dried so as to yield solvent resistant films which display excellent adhesion to a variety of substrates; said coating compositions being based upon novel polymeric derivatives resulting from the reaction between a vinyl polymer containing anhydride groups within its molecule and an ester-alcohol derived from an unsaturated fatty acid.

---

This invention relates to novel water soluble, surface coating compositions characterized by their ability to crosslink upon being air-dried so as to yield solvent resistant films which display excellent adhesion to a variety of substrates.

Commercial coating compositions have consisted, primarily, of the alkyd resin solvent-type and the aqueous emulsion or latex type composition. Though each of the latter has many desirable features, there are many important properties which are exclusive to one of these systems and are thus lacking in the other. For example, the alkyd resin systems, because of the organic solvents utilized therein, can not exhibit the freedom from odor, ease of application, absence of fire hazard, economy, or ease of cleaning which the latex systems offer. On the other hand, latex systems are often burdened with the need for including a formidable number of additives such as water sensitive surface active agents, protective colloids, and plasticizers, etc. In addition, latex systems are often limited as to their loading capability, i.e. the amount of pigment which may be contained therein, for any particular level of gloss. They are also somewhat dificient with regard to the open time i.e. wet time, of their films, thereby resulting in the exhibition of restricted lapping characteristics, i.e. the inability on the part of subsequently applied paint films to exhibit uniformity of appearance to previously coated adjacent areas.

Thus, it is the prime object of this invention to prepare coating formulations which exhibit the best features of both alkyd resin and latex systems so as to be characterized by water solubility coupled with good loading, levelling, and adhesion characteristics. It is a further object to provide coating formulations which when crosslinked exhibit resistance to water, alkali, and organic solvents. Various other objects and advantages of our invention will become apparent to the practitioner in the course of this disclosure.

We have now discovered that by preparing paint formulations based upon novel water soluble resin compositions, we are able to overcome the difficulties inherent in many prior art paints. Thus, because of the water solubility and crosslinking ability of these novel resins, we are able to benefit from the advantages of water-based systems while, nonetheless, achieving water and organic solvent resistance in the dried films resulting from these formulations.

The novel synthetic resins utilizable in the paint formulations of this invention contain at least one mer, i.e. a repetitive chemical structural unit, corresponding to the following formula:

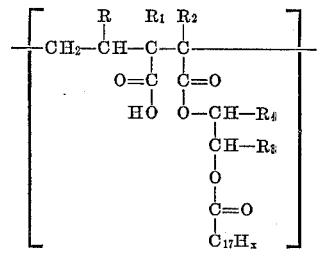

wherein R is a radical selected from the group consisting of hydrogen, phenyl, substituted phenyl, methoxy and acetoxy radicals; wherein $R_1$, $R_2$, $R_3$ and $R_4$ are radicals selected from the group consisting of hydrogen radicals and alkyl radicals; and, wherein $x$ is an integer having a value of from 27 to 33 inclusive. The latter resins should, moreover, have a molecular weight in the range of from about 1000 to 8000 and an acidity of from about 0.53 to 2.7 milliequivalents per gram.

A detailed description of these resin compositions and their method of preparation may be found in our co-pending application, Ser. No. 483,818, filed Aug. 30, 1965. However, it may be briefly noted that these novel resin products may be prepared by reacting a vinyl polymer, which contains anhydride groups, with an ester-alcohol prepared from one or more polyunsaturated fatty acids. The anhydride component of the vinyl copolymers may be derived from any ethylenically unsaturated anhydrides, such as maleic anhydride, which are capable of undergoing free radical initiated polymerization reactions. The ethlenically unsaturated comonomers which may be copolymerized with the selected anhydride monomer may be selected from a long list of such comonomers and may include, for example, styrene and subbstituted styrenes, acrylic and methacrylic acid esters of aliphatic alcohols, etc. The ester-alcohols utilized in this reaction may be prepared by any of the reaction procedures well known to those skilled in the art. One such method involves the base catalyzed addition of an epoxide to an unsaturated acid or mixture of acids which may be obtained by the hydrolysis of drying oils such as soya, safflower, linseed and dehydrated castor, etc.

The resulting resin compositions thus contain water solubilizing carboxyl groups as part of their vinyl polymer backbone. This factor enables these resins to exhibit the desired water solubility while also being able to crosslink on drying in air and thereby yield films exhibiting excellent resistance to alkali and organic solvents.

The resin solutions utilized in the process of this invention are prepared by dissolving the selected resin, at a concentration of about 70 to 95%, by weight, solids, in such water soluble alcohols and ether alcohols as isopropanol, n-propanol, diethylene glycol monobutyl ether, ethylene glycol monobutyl ether, or a combination of any two or more of the latter solvents. This is accomplished by admixing the selected resin with a portion of the solvents, heating the dispersion to a temperature of from about 50 to 60° C. and then adding, under agitation, the remainder of the solvent system.

The carboxyl groups present in the polymer chain are thereupon neutralized with a water soluble base in order to solubilize the resin by converting it into the form of a salt. The choice of neutralizing base is left to the discretion of the practictioner, although such factors as volatility, economy, odor, and inertness to the polymer system must be considered. Thus, among applicable water soluble bases are alkali metal hydroxides including sodium hydroxide, potassium hydroxide, and lithium hydroxide; ammonium hydroxide; aliphatic amines such as trimethyl, triethyl and triisopropyl amine; and, alkanolamines such as dimethylaminoethanol, triethanolamine, ethanolamine, diethanolamine, diethylaminoethanol, and triisopropanolamine. These neutralizing bases are added in the form of aqueous solutions containing from about 8.5 to 15.5% by weight, of the base. As a result of this neutralization procedure, the resulting resins are neutralized to the extent of about 50 to 100% of their carboxyl content. Thus, the neutralized resin compositions applicable for use in the process of this invention contain, as part of the molecule thereof, at least one mer corresponding to the formula

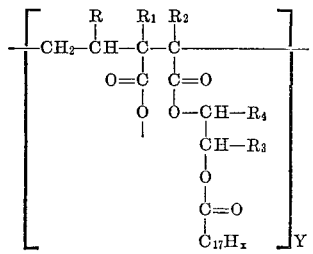

wherein R is a radical selected from the group consisting of hydrogen, phenyl, substituted phenyl, methoxy and acetoxy radicals; wherein $R_1$, $R_2$, $R_3$ and $R_4$ are radicals selected from the group consisting of hydrogen radicals and alkyl radicals; wherein $x$ is an integer having a value of from 27 to 33 inclusive; and, wherein Y is a cation derived from a water soluble base selected from the group consisting of alkali metal hydroxides, ammonium hydroxide, aliphatic amines and alkanolamines.

Prior to being used in the preparation of paint formulations, the neutralized resin solution is diluted to a total solids content of from about 35 to 65%, by weight, and, preferably, to about 50% by the addition of any one or more of the solvents specified hereinabove. At this stage, the water:solvent ratio ranges from about 40:60 to 80:20 and, preferably, about 60:40.

The neutralized, water soluble resin solutions can then be utilized as the dispersion medium, i.e. vehicle, in the preparation of gloss and semi-gloss paint formulations. One of their prime advantages, when used in this manner, is that they eliminate the need for the addition of water-sensitive surfactants which are always required to aid in the pigment dispersion of latex systems. The only ingredients which need be dispersed in the paint formulations any additional water or organic solvent whose presand any additional water or organic solvent whose presence may be desired. The pigments can be dispersed in the vehicle by the use of any of the well known pigment dispersion techniques such as ball or pebble milling, roller milling, sand grinding, high speed stone milling and high speed impeller milling. The resulting formulation is preferably dispersed to a grind having a value of about 7 to 8 on the Hegeman scale; the latter scale serving as an indication of the degree of dispersion of a paint formulation wherein a value of 7 to 8 is indicative of a finely dispersed pigment slurry as compared, for example, with a Hegeman value of 0 to 2.

The pigments applicable for inclusion in the paint formulations of this invention may comprise pigments such, for example, as rutile titanium dioxide, anatase titanium dioxide, zinc sulfide, zinc oxide, antimony oxide, zirconium oxide, white lead, lithopone, titanium-calcium pigment, titanium-barium pigment, yellow iron oxide, and chromium oxide green, etc. The titanium dioxide pigments are ordinarily preferred.

While these pigments may comprise the entire pigment phase, it is usually economically impractical to employ them as the sole pigment component. Thus, the latter pigments are extended with well known pigment extenders which comprise low cost, inert minerals such as calcium carbonate, talc, magnesium silicates, aluminum silicates, diatomaceous earth, asbestine and mica.

With regard to proportions, the pigment may be present in concentrations ranging from about 150 to 275 pounds/100 gallons of paint, while the pigment extenders may be present in concentrations ranging from about 0 to 150 pounds/100 gallons of paint. These values correspond to pigment volume concentrations ranging from about 15 to 50%. The pigment volume concentration represents the ratio, expressed on a percentage basis, of the volume of the pigment composition to the total volume of the paint formulation. The proper adjustment of the pigment concentration volume thus permits the paint formulations of this invention to encompass the entire gloss range, i.e. 60° gloss meter readings extending from 30 to 70 and above.

Upon completion of the pigment grinding, any additional quantities of resin solution, water and organic solvent which are required for the desired pigment volume concentration of the formulation may be added. The latter quantities of water, solvent or resin solution are not added to the initial pigment dispersion because it is desirable to have present in the latter dispersion only that concentration of resin solution and solvent which is sufficient to provide the proper viscosity for the subsequent pigment grinding procedure. Thus, the total amount of resin solids in the final paint formulation may range from about 12 to 30%, by weight. With regard to the solvent concentration in the final paint formulation, about 60 to 70% of the total weight of the solvents in the paint may consist of water while organic solvents may comprise the remaining 30 to 40% of the total weight of the solvents i.e. water plus organic solvents in the paint.

Driers, which are the only additional ingredients required in our novel paint formulations, are also added at this point. These driers consist of water dispersable compounds such as salts whose metallic ions may comprise lead, cobalt, zirconium, calcium and manganese. Specific examples of these driers include lead naphthenate, cobalt naphthenate, zirconium naphthenate, cobalt octoate, lead octoate, and zirconium octoate, etc. When either a lead or zirconium dried is used, a cobalt drier must also be utilized in conjunction therewith. In stating the concentrations of these driers, it is to be understood that the percentages stated refer to the percent, by weight, of the metal in the drier as based on the weight of resin solids in the paint formulation. Thus, lead driers may be used in concentrations ranging from about 0.25 to 0.5% in conjunction with concentrations of about 0.01 to 0.03% of a cobalt drier. Zirconium driers are used in a concentration range of from about 0.05 to 1.5% in conjunction with about 0.01 to 0.03% of a cobalt drier. When cobalt driers are used individually, they may be present in ranges of from about 0.03 to 0.3%.

Additional ingredients may also be included in the paint formulations of this invention, if desired by the practitioner. Among these optional additives are surfactants such as alkyl phenyl polyethylene glycol ethers and alkali metal salts of polyphosphates; anti-foam agents such as high boiling alcohols, polyglycols, silicone liquids and sulfonated tallow; and fungicidal preservatives such as phenyl mercurial compounds.

The paint formulations of this invention may be applied by means of any of the conventional methods, e.g. brush, roller, spray. They may be applied to a wide variety of substrates including wood, metal, glass and plastics, etc. It is necessary, as with all coatings, that the substrate be properly primed to accept the coating. This exceptional versatility, with regard to the substrates which may be used with our paints, is due in great part to the excellent loading and adhesion characteristics of these paints and to the fact that these coatings can be thinned by the addition of water and are thereby readily available in an unlimited range of viscosities.

As previously noted, the paint formulations of this invention exhibit most of the desirable features of the alkyd resin based paints with the added advantage of having water serve as the primary solvent. The films derived from our novel paint formulations are hard, durable, and resistant to water, alkali and organic solvents. These beneficial properties result directly from the crosslinking, upon drying, of the unique polymer systems incorporated therein. In addition, these films show rapid drying characteristics at ambient temperatures. Furthermore, the presence of polar carboxyl groups in the resin vehicle increases the adhesion of these films to many substrates.

An additional application for the unique resin compositions is their inclusion in latex paints to improve levelling, surface hardness, scrub resistance and adhesion. When utilized for this purpose, they are added either prior to grinding, whereby they may serve as a dispersant for the pigment, or after grinding to the let-down.

The following examples will further illustrate the embodiment of this invention. In these examples all parts given are by weight unless otherwise noted.

EXAMPLE I

This example illustrates the preparation of a typical paint formulation of this invention.

A vessel containing 204 parts of a resin comprising the reaction product of a styrene-maleic anhydride copolymer and the hydroxypropyl ester of safflower fatty acids and having a molecular weight in the order of 3700 together with 41 parts of isopropanol and 41 parts of ethylene glycol monobutyl ether was heated to 50° C. so as to thereby dissolve the resin. A solution containing 19 parts of triethylamine in 122 parts of water was then added to neutralize the acidity of the resin by forming a salt therewith.

The resulting solution, containing 50%, by weight, resin solids, was then utilized in a paint formulation containing the following ingredients:

| | Parts |
|---|---|
| Rutile titanium dioxide | 225 |
| Calcium carbonate | 50 |
| Resin solution containing 50% by wt., solids (as described hereinabove) | 200 |
| Water | 225 |
| Isopropanol | 25 |
| Diethylene glycol monobutyl ether | 56 |

The above described formulation was then ground for 15 hours in a pebble mill and the resulting pigment dispersion was found to have a degree of dispersion equivalent to a grind value of 8 on the Hegeman scale.

The following ingredients were then added to the pigment dispersion in order to complete the preparation of the paint formulation which had a pigment volume concentration of 26%.

| | Parts |
|---|---|
| Resin solution containing 50%, by wt., solids (as described hereinabove | 225 |
| Isopropanol | 22 |
| Cobalt naphthenate drier (containing 6% by wt., of cobalt) | 5 |

The resulting paint formulation was readily thinned with water and was easily removed from brushes and rollers upon rinsing with water. It showed excellent brushing qualities when applied to primed wood panels. Films derived from this paint dried rapidly and showed excellent adhesion properties when evaluated by being scratched with a knife blade. In addition, these films were found to be impervious to attack from dilute alkali as well as from acetone, mineral spirits and other common organic solvents. More detailed data on these paint coatings will be presented in Example IV, hereinbelow.

EXAMPLE II

This example illustrates both the crosslinking ability and the solvent resistance of the resin compositions utilized in the novel paint formulations of this invention.

The resin composition described in Example I, hereinabove, was admixed with the identical cobalt naphthenate drier. This mixture was found to be completely soluble in acetone and toluene. Films derived from this mixture were then allowed to dry at room temperature for a period of one week. Portions of these films were then immersed, respectively, in acetone and toluene and the resulting solvent-film mixtures submitted to a conventional reflux procedure.

The excellent crosslinking ability and solvent resistance of the tested resin composition was clearly indicated by the fact that the thus crosslinked films were now 70%, by weight, insoluble in toluene and 76% by weight, insoluble in acetone.

EXAMPLE III

This example illustrates the preparation of additional paint formulations by means of the process of this invention.

The procedure utilized for the preparation of the paint formulations of this example was identical to the procedure set forth in Example I, hereinabove, with the exception that the resin composition of Formulation 1 comprised the reaction product of a styrene-maleic anhydride copolymer with the hydroxypropyl ester of dehydrated castor oil fatty acids and utilized triethanolamine as the neutralizing base, while the resin composition of Formulation 2 comprised the reaction product of a methyl vinyl ether-maleic anhydride copolymer with the hydroxypropyl ester of safflower fatty acids and utilized diethylaminoethanol as the neutralizing base.

The following formulations were prepared by first preparing dispersion "A," grinding the latter dispersion for 15 hours in a pebble mill and then admixing solution "B" therewith.

FORMULATION 1

| Dispersion A | Parts | Solution B | Parts |
|---|---|---|---|
| Rutile titanium dioxide | 225 | Resin solution containing 50%, by weight, solids. | 256 |
| Resin solution containing 50%, by weight, solids. | 180 | Diethylene glycol monobutyl ether | 56 |
| Water | 203 | isopropanol. | 22 |
| Isopropanol | 25 | Cobalt naphthenate drier (containing 6%, by weight, of cobalt). | 5 |

FORMULATION 2

| Dispersion A | Parts | Solution B | Parts |
|---|---|---|---|
| Rutile titanium dioxide | 225 | Resin solution containing 50%, by weight, solids. | 256 |
| Calcium carbonate | 75 | Diethylene glycol monobutyl ether. | 53 |
| Resin solution containing 50%, by weight, solids. | 200 | n-Propanol | 21 |
| Water | 245 | Zirconium naphthenate drier (containing 6%, by weight of Zr). | 10 |
| n-Propanol | 22 | Cobalt naphthenate drier (containing 6%, by weight, of Co). | 1 |

When applied to primed wood panels, both Formulation 1, having a pigment volume concentration of 20%, and Formulation 2, having a pigment volume concentration of 30%, yielded films whose properties were fully comparable to those obtained with the formulation described in Example I, hereinabove.

EXAMPLE IV

This example illustrates the excellent properties exhibited by the dried films derived from the novel paint formulations of this invention. It further illustrates that these novel paint formulations combine many of the better properties of both alkyd resin and latex paint systems and in some instances are actually superior to either of the latter prior art systems.

The following test procedures were conducted using the paint formulation prepared in Example I, hereinabove, which was compared with both a commercial alkyd resin type paint and an alkyd-modified latex system.

Levelling.—The selected coating was applied to a drawdown chart, i.e. a standardized paper surface for evaluating paint films, which has sealed (lacquer coated), unsealed, black and white areas thereon, using a New York Paint Club Levelling Test Blade. The latter has a 5″ draw down blade with 5 sets of paired notches cut to depths ranging from 0.01 to 0.16″; the latter blade thus being capable of applying films whose wet thicknesses range, accordingly, from 0.01 to 0.16″. A rating of "0" was indicative of poor levelling wherein the applied films remained completely separated, while a rating of "10" was indicative of excellent levelling wherein there was complete merging in the dried film of even the shallowest paint films.

Gloss.—A 3 mil wet film of the paint formulation being tested was applied to a white pigmented glass panel. Gloss readings were taken of the film, after drying, with a standardized 60° Gloss Meter. The readings were reported in gloss units with a higher number being indicative of superior gloss.

Brightness.—A 3 mil wet film of the formulation being tested was cast on a hiding power chart, i.e. the darkened portion of the drawdown chart defined under the levelling test, hereinabove. Readings were taken on the dried film with a reflectometer equipped with a search unit using a green tristimulus filter. This search unit measured the diffuse reflection off the surface of the dry film. The values reported represent the degree to which the surface of the film approaches "perfect white," as indicated by a 100% reflectance over the visible spectrum.

Wet adhesion.—A 3 mil wet film of the formulation being tested was cast on a green panel. A 6″ X-shaped incision was then made in the middle of the dry film whereupon the film was scrubbed, using a mechanically driven scrubbing brush, with an aqueous solution containing 0.5% by weight, of nonyl phenoxy polyoxyethylene ethanol. Ten cubic centimeters of the latter solution were added to the film surface and an additional five cubic centimeters were then added after every 150 strokes. The end-point was reached when film peel occurred at the vertex of the X-shaped incision. Since a wet adhesion value of 2000 strokes is generally considered to be sufficient in order to classify a paint film as "superior," all of the samples that were tested and which passed the 2000 stroke mark were removed from the test and assigned a wet adhesion value of "2000+" strokes.

Tack-free time.—A 1.5 mil wet film of the formulation being tested was cast on a clear plate glass panel. Using the index finger, a slight downward pressure was then exerted on the test film in such a manner that from ½ to ¾ of the bottom area of the first joint was in contact with the film. The coating was considered tack-free at the moment when no finger mark was left on its surface.

Lap time.—The paint formulation being tested was brushed onto a portion of the surface of a sealed wallboard substrate. At indeterminate intervals of time, fresh paint was applied to an area immediately adjacent to the initially painted area with the freshly painted areas being blended, i.e. overlapped, into the previously painted areas. The overlapped areas were observed for uniformity of appearance. The values reported indicate the length of time during which the initially painted areas can be overlapped (blended in) while still retaining a uniform appearance. It should be noted that although overlapping is a desired paint characteristic, it is equally disadvantageous to have either an overly lengthy lap time, or an abbreviated lap time. Thus, an abbreviated lap time does not provide sufficient time for the blending in of additional paint, while an extremely lengthy lap time reflects poor drying characteristics.

The results of the above described tests are presented in the following table:

| Property | Water Soluble system (as described in Example I, hereinabove) | Alkyd system | Latex system |
| --- | --- | --- | --- |
| Pigment volume concentration | 26 | 38 | 15.4 |
| Levelling | 8 | 4 | 0–1 |
| Gloss (gloss units) | 63 | 42 | 65 |
| Whiteness | 90.5 | 90 | 87.5 |
| Wet adhesion (strokes) | 2000+ | 2000+ | 100 |
| Tack-free time (hours) | 2–4 | 24 | 2 |
| Lap time (minutes) | 45 | 60 | 5–10 |

The latter results clearly indicate the effectiveness of the novel paint formulations of this invention.

Summarizing, it is thus seen that this invention provides for the preparation of novel paint formulations characterized by their water solubility, ability to readily crosslink at ambient temperatures, and resistance to both aqueous and non-aqueous solvents.

Variations may, of course, be made in procedures, proportions, and materials without departing from the scope of this invention which is limited only by the following claims.

What is claimed is:

1. A water dilutable paint composition capable of readily crosslinking at ambient temperatures and of yielding dry films characterized by their solvent resistance comprising a blend of (a) a neutralized, water soluble resin composition containing, as part of the molecule thereof, at least one mer corresponding to the formula

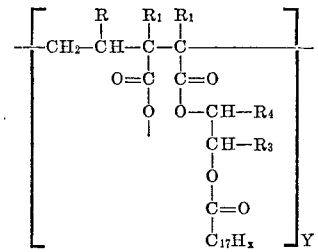

wherein R is a radical selected from the group consisting of hydrogen, phenyl, substituted phenyl, methoxy and acetoxy radicals; wherein $R_1$, $R_2$, $R_3$ and $R_4$ are radicals selected from the group consisting of hydrogen radicals and alkyl radicals; wherein $x$ is an integer having a value of from 27 to 33 inclusive; and, wherein Y is a cation derived from a water soluble base selected from the group consisting of alkali metal hydroxides, ammonium hydroxide, aliphatic amines and alkanolamines; (b) at least one pigment; (c) a solvent combination comprising water and at least one water soluble solvent selected from the group consisting of aliphatic, monohydric alcohols and ether alcohols; and, (d) at least one water dispersible metallic drier; said resin composition being dissolved in said water soluble solvent in a concentration of at least about 70%, by weight, of resin solids.

2. The paint composition of claim 1, wherein said resin composition has a molecular weight in the range of from about 1000 to 8000; an acidity value, prior to its neutralization, of from about 0.53 to 2.70 milliequivalents per gram; and, is present in said paint composition in a concentration ranging from about 12 to 30%, by weight.

3. The paint composition of claim 1, wherein said pigment is present in a concentration ranging from about 150 to 275 pounds per 100 gallons of said paint composition.

4. The paint composition of claim 1, wherein said metallic drier is a water dispersable salt whose metallic ion is selected from the group consisting of lead, cobalt, zirconium, calcium, and manganese.

5. The paint composition of claim 1, wherein said resin composition comprises the reaction product of a styrene-maleic anhydride copolymer and the hydroxypropyl ester of safflower fatty acids.

6. The paint composition of claim 1, wherein a pigment extender comprising an inert mineral is present therein in a concentration ranging from about 0 to 150 pounds per 100 gallons of said paint composition.

7. A water soluble paint vehicle suitable for use in the formulation of water dilutable, rearily crosslinkable paint compositions comprising a neutralized resin composition containing, as part of the molecule thereof, at least one mer corresponding to the formula

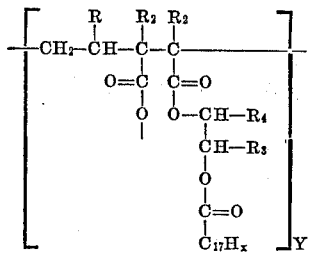

wherein R is a radical selected from the group consisting of hydrogen, phenyl, substituted phenyl, methoxy and acetoxy radicals: wherein $R_1$, $R_2$, $R_3$ and $R_4$ are radicals selected from the group consisting of hydrogen radicals and alkyl radicals; wherein $x$ is an integer having a value of from 27 to 33 inclusive; and, wherein Y is a cation derived from a water soluble base selected from the group consisting of akali metal hydroxides, ammonium hydroxide, aliphatic amines and alkanolamines dissolved in a solvent combination comprising water and at least one water soluble solvent selected from the group consisting of aliphatic, monohydric alcohols and ether alcohols; said resin composition being dissolved in said water soluble solvent in a concentration of at least about 70%, by weight, of resin solids.

8. The paint vehicle of claim 7, wherein said resin composition comprises the reaction product of a styrene-maleic anhydride copolymer and the hydroxy-propyl ester of safflower fatty acids.

9. The paint vehicle of claim 7, having a total solids content ranging from about 35 to 65%, by weight.

10. A method for the preparation of water dilutable paint compositions capable of yielding dry films characterized by their solvent resistance comprising the steps of: (1) dissolving a resin composition containing, as part of the molecule thereof, at least one mer corresponding to the formula

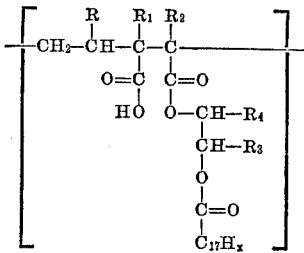

wherein R is a radical selected from the group consisting of hydrogen, phenyl, substituted phenyl, methoxy and acetoxy radicals; wherein $R_1$, $R_2$, $R_3$ and $R_4$ are radicals selected from the group consisting of hydrogen radicals and alkyl radicals; and, wherein $x$ is an integer having a value of from 27 to 33 inclusive in at least one water soluble solvent selected from the group consisting of aliphatic, monohydric alcohols and ether alcohols; (2) neutralizing the resin composition solution obtained in step (1) by the addition thereto of an aqueous solution of a water soluble base selected from the group consisting of alkali metal hydroxides, ammonium hydroxide, aliphatic amines, and alkanolamines; (3) admixing the neutralized resin solution obtained in step (2) with at least one pigment and an additional solvent combination comprising water and a water soluble solvent selected from the group consisting of aliphatic, monohydric alcohols and ether alcohols; (4) grinding said dispersion obtained in step (3); and, (5) admixing the ground dispersion obtained in step (4) with an additional portion of the resin solution obtained in step (2), an additional portion of the solvent combination of step (3) and at least one water dispersible metallic drier; said resin composition being dissolved in said water soluble solvent in a concentration of at least about 70%, by weight, of resin solids.

11. The method of claim 10, wherein said resin composition has a molecular weight in the range of from about 1000 to 8000, an acidity value of from about 0.53 to 2.70 milliequivalents per gram, and is present in said paint composition in a concentration ranging from about 12 to 30%, by weight.

12. The method of claim 10, wherein said pigment is present in a concentration ranging from about 150 to 275 pounds per 100 gallons of said paint composition.

13. The method of claim 10, wherein said metallic drier is a water dispersable salt whose metallic ion is selected from the group consisting of lead, cobalt, zirconium, calcium and manganese.

14. The method of claim 10, wherein said resin composition comprises the reaction product of a styrene-maleic anhydride copolymer and the hydroxypropyl ester of safflower fatty acids.

15. The method of claim 10, wherein a pigment extender comprising an inert mineral is present in said paint composition in a concentration ranging from about 0 to 150 pounds per 100 gallons of said paint composition.

16. A substrate coated with a dry paint film, said film being deposited from a paint composition comprising a blend of (a) a neutralized, water soluble resin composition containing, as part of the molecule thereof, at least one mer corresponding to the formula

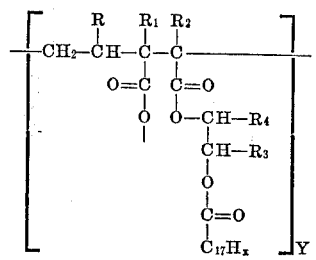

wherein R is a radical selected from the group consisting of hydrogen, phenyl, substituted phenyl, methoxy and acetoxy radicals; wherein $R_1$, $R_2$, $R_3$ and $R_4$ are radicals selected from the group consisting of hydrogen radicals and alkyl radicals; wherein $x$ is an integer having a value of from 27 to 33 inclusive; and, wherein Y is a cation derived from a water soluble base selected from the group consisting of alkali metal hydroxides, ammonium hydroxide, aliphatic amines and alkanolamines; (b) at least one pigment; (c) a solvent combination comprising water and at least one water soluble solvent selected from the group consisting of aliphatic, monohydric alcohols and ether alcohols; and (d) at least one water dispersible metallic drier; said resin composition being dissolved in said water soluble solvent in a concentration of at least about 70%, by weight, of resin solids.

References Cited

UNITED STATES PATENTS

| | | | |
|---|---|---|---|
| 2,977,334 | 3/1961 | Zopf et al. | 260—27 |
| 3,085,986 | 4/1963 | Muskat | 260—31.8 |
| 3,085,994 | 4/1963 | Muskat | 260—78.5 |
| 3,098,834 | 7/1963 | Jerabek | 260—23.7 |
| 3,251,790 | 5/1966 | Christenson et al. | 260—18 |
| 3,284,385 | 11/1966 | D'Alelio | 260—23 |
| 3,340,295 | 9/1967 | Wheeler et al. | 260—486 |
| 3,357,936 | 12/1967 | Zimmerman et al. | 260—22 |

DONALD E. CZAJA, *Primary Examiner.*

R. A. WHITE, *Assistant Examiner.*

U.S. Cl X.R.

260—29.6, 33.2, 33.4, 41, 78.5; 117—161